United States Patent Office 3,480,086
Patented Nov. 25, 1969

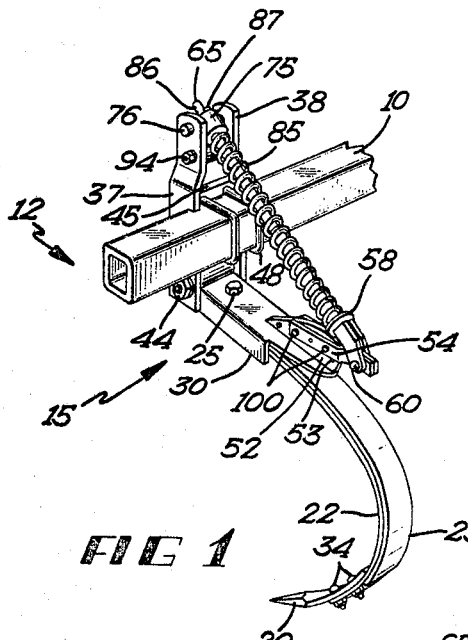
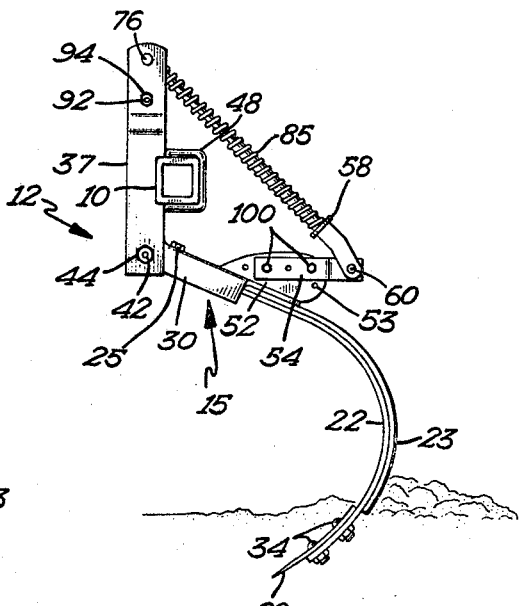
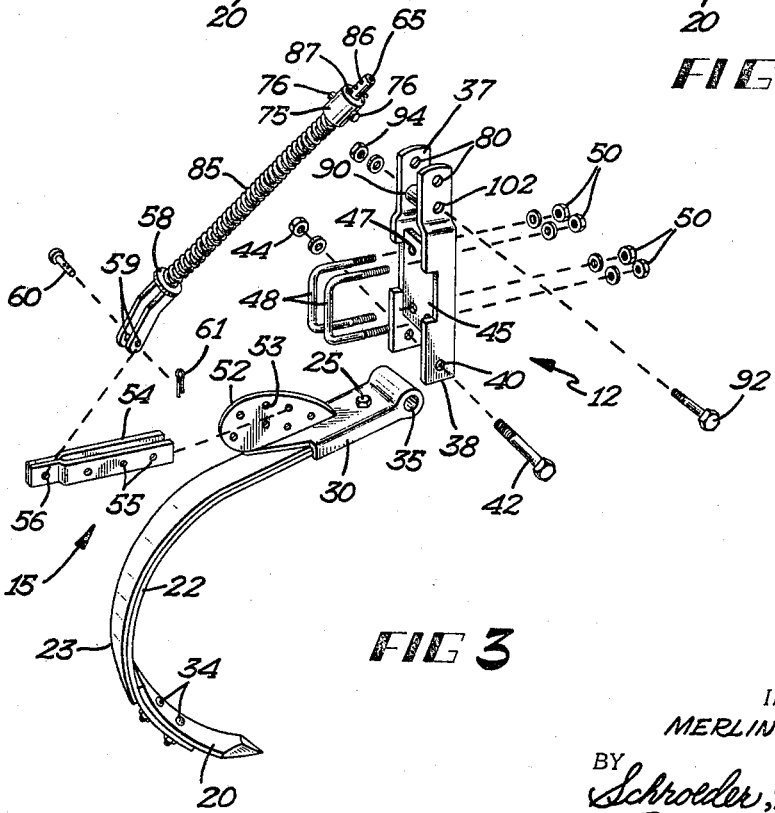

3,480,086
ADJUSTABLE SHANK ASSEMBLY
Merlin A. Groenke, Glencoe, Minn., assignor to Portable Elevator Manufacturing Company, Bloomington, Ill., a corporation of Illinois
Filed Feb. 17, 1967, Ser. No. 616,898
The portion of the term of the patent subsequent to June 28, 1983, has been disclaimed
Int. Cl. A01b *15/20, 23/00, 35/20*
U.S. Cl. 172—710
2 Claims

ABSTRACT OF THE DISCLOSURE

This disclosure is directed to an adjustable shank assembly for mounting cultivating tools on agricultural implements. The improved shank assembly for mounting the cultivating tool is adjustable to position the angle of the cultivating tool and its depth relative to the earth being worked to take care of varying soil conditions. The shank assembly further mounts the tool for spring biased pivotal movement to permit the tool to swing clear of the earth upon encountering immovable obstructions. In the improved shank assembly, the tool support mounting the tool has a raised flange or rib section with a plurality of connecting apertures therein. This tool support is connected through a coupling member having similar apertures therein to a pressure rod having the spring biasing means associated therewith. The pressure rod is journaled on the frame of the shank assembly. Alignment of the various apertures in the raised rib section of the tool support with those in the coupling member adjusts the position of the tool support with the tool thereon relative to the frame of the shank assembly and hence the ground being worked to provide a simplified angle adjustment of the tool with the earth for varying soil working conditions.

---

This invention relates to an assembly for mounting cultivating tools on agricultural equipment and more particularly to an improved shank assembly of the spring bias type used in the mounting of cultivating tools.

Tool mounting assemblies of this general type have been well known in the past and have taken a variety of forms. With varying soil conditions, cultivating tools must be adustable from the standpoint of depth of cultivation and must be capable of swinging clear of obstructions to prevent breakage of the cultivating tool. It is recognized in agricultural implements to adust simultaneously the depths of all tools by mounting them specially on a rack in which all the tools are connected together and movable in the adustment. Such a structure is generally complex and expensive. In addition, adustment of the individual mounting shank assemblies is known and my prior Patent No. 3,258,076 dated June 28, 1966 and entitled Adustable Spring Clamp Shank Assembly is an example of such structures.

The present invention in the improved adustable shank assembly is directed to a simplified structure which is readily adjustable, is simple in design and provides for a plurality of depth adjustments suitable for most soil conditions. This improved shank assembly is capable of incorporation on varying types of agricultural implements and for mounting varying cultivating tools. It provides an arrangement for spring biasing a tool support carrying the cultivating tool and for pivotal mounting of the same with a readily accessible adjustment feature to provide the depth adjustment. In addition the overall structure is greatly simplified over my prior patented disclosure in the elimination of parts and an increase in the strength of structure of the same to provide trouble-free operation. In the improved shank assembly, the cultivating tool may be preloaded or biased to permit the tool to swing free of obstructions and operate under varying soil conditions with the variety of depth adjustments. As in my prior patented disclosure, the improved adjustable shank assembly provides for a plurality of individual adjustments on each tool, which under normal circumstances, is satisfactory for varying cultivating operations, since the individual tool when adjusted will be operated through substantially the same soil condition without the need for further adjustment. Thus, it eliminates special cultivator designs and complicated individual tool mountings.

Therefore, it is an object of this invention to provide an improved adjustable shank assembly for the mounting of cultivating tools on agricultural implements.

Another object of this invention is to provide an improved adjustable shank assembly which may be readily adjusted for varying depth conditions or working conditions of a cultivating tool and biased to permit the tool to swing free of obstructions.

Another object of this invention is to provide in an improved shank assembly a design which is simple, economical to manufacture and easy to maintain.

These and other objects of this invention will become apparent from a reading of the attached description together with the drawings wherein:

FIGURE 1 is a perspective view of the improved adjustable shank assembly,

FIGURE 2 is a side elevation view of the improved adjustable shank assembly with parts broken away, and FIGURE 3 is an exploded view of the improved adjustable shank assembly.

The improved adjustable shank assembly is adapted to be mounted on and carried by a variety of types of agricultural apparatus of the cultivating type. In FIGURES 1 and 2 of the drawings an elongated support member or frame, shown generally at 10, indicates that portion of a piece of agricultural equipment upon which the shank assembly is normally mounted. This frame would extend within the cultivating apparatus transversely of the same and support a plurality of tools in spaced relationship. A number of such frame members mounted on the cultivating apparatus in spaced parallel relationship would provide mounting surfaces for the adjustable shank assemblies in a staggered and ganged relationship to support a plurality of cultivating tools for the cultivating apparatus. It will be further understood that the frame members in a ganged relationship would normally be positioned on the cultivating apparatus so as to be moved between working and a tool raised position for transportation purposes.

The improved shank assembly is shown in the drawings as comprising a connecting or mounting frame 12 which is carried by the support member or frame 10 of the cultivating apparatus. The connecting or mounting frame 12 pivotally mounts a tool support member 15 to which a cultivating tool, indicated generally at 20, is attached. In the drawings, the cultivating tool 20 is shown as a chisel plow blade. This chisel plow blade is actually supported by a main shank leaf spring 22 and a helper shank leaf spring 23 which is attached at one extremity to the tool support member 15 and carries the chisel plow blade 20 at the opposite extremity. The leaf spring members 22 and 23 are positioned in an overlying relationship and are attached to the under surface of the tool support member 15 through the suitable screw or nut and bolt means 25 which thread through apertures in the tool support member and leaf spring members to secure the same thereon. As is conventional in tool support member 15 the undersurface is channeled or flanged, such as indicated at 30, to rigidly support the sides of the leaf spring members 22, 23 and prevent translational movement of the same. The chisel plow blade 20 or tool is secured to the shank leaf 23 through suitable nuts and bolts 34.

The tool support member 15 is in turn mounted on the connecting frame or mounting frame 12 through a pivot section 35 which is included in one extremity of the tool support member. This pivot section 35 is generally cylindrical in form and fits between side plates 37 and 38 forming the main portion of the connecting frame or mounting frame 12. The side plates 37, 38 have apertures 40 therein through which a bolt 42 extends mating with the cylindrical section or pivot section 35 to pivotally mount the tool support member on one extremity of the connecting frame or near the extremities of the side plates 37, 38. Bolt 42 is held in position by means of a lock nut and washer 44. The side plates 37 and 38 of the connecting frame 12 are held in a spaced relationship by means of a connecting plate 45 positioned intermediate the extent of the side plates and connected thereto through suitable means, such as welding. The connecting or mounting plate 45 includes apertures 47 therein through which a pair of U-shaped bolt members 48 extend to fit around the frame or support member 10 and secure the connecting frame to the support member. Suitable nut and bolt means 50 hold the connecting frame member on the support member 10 in a conventional manner.

The tool support member 15 has a raised rib section 52 on the upper surface thereof remote or opposite from the channel section 40. This rib section includes a plurality of apertures 53 which provide the adjustable connection between the connecting frame and the tool support. A bifurcated coupling member 54 fits around the rib section 52 and has a plurality of apertures 55 spaced along the extent of the same which, as will be later noted, cooperate with and align with the apertures 53 in the rib section 52 to give the varying adjustments for angles of connection between the connecting frame and the tool support member. In addition, the bifurcated member 54 has a connecting aperture 56 at the closed end of the same through which a clevis or coupling 58 connects to the bifurcated member 54. A suitable pin 60 and cotter key 61 extending through an aperture 59 in the clevis and the aperture 56 in the coupling member 54 secure the clevis to the coupling member. Clevis 55 has a pressure rod 65 suitably connected thereto so that the pressure rod 65 is pivotally mounted on the coupling member 54 to provide relative movement therebetween with movement of the tool support member 15. The free extremity of the pressure rod 65 opposite the clevis 58 is positioned in a guide member or support 75, the guide member or support having cylindrical journaling flanges 76 at diametrically opposed points on the surface of the same to permit it to be mounted in apertures 80 in the extremities of the side plates 37, 38 making up the connecting frame. The biasing pressure for the tool support member is provided through or by a spring 85 encircling the pressure rod and bearing against the clevis 58 at one extremity and the guide member 75 at the other extremity. A plurality of holes 86 in the free extremity of the pressure rod permit a cotter key 87 to be positioned therethrough and to preload the compression of the spring 85 by positioning the guide member 75 against the same in a conventional manner. The cotter key 87 and apertures 86 together with a journal mounting of the trunnion 76 of the guide member 75 in the apertures 80 provide a stop structure for the pressure rod to restrict movement of the pressure rod out of the guide member and have movement of the tool in the direction of the spring bias. A suitable spacer member 90 positioned between the side plates 37, 38 of the connecting frame adjacent the journaling apertures 80 in the extremity thereof permits assembly of the guide member in the spaced plates and insures that the spaced plates will be held in a rigid spaced relationship permitting the trunnion 76 to rotate in the apertures 80 for the purpose of pivotally mounting this extremity of the pressure rod. A suitable bolt 92 and nut means 94 clamp the spacer member 90 in this relationship.

In the assembled relationship of the shank assembly, the tool 20 which is mounted on the leaf springs 22, 23 and connected to the tool support member 15 will be pivotally mounted in one extremity of the connecting frame and biased for pivotal rotation thereon. This shank assembly could be mounted on a suitable frame of an implement such as is shown in FIGURES 1 and 2. The biasing pressure for the tool support member in its pivotal movement is adjustable by positioning the extremity of the rod 65 through the guide member 75 and compressing the spring to preload the same. The cotter key, and a washer if used, will bear against the end of the support or guide support or member 75 to retain the spring in a compressed relationship. This mounting structure permits the pressure rod to slide through the guide member 75 and compress the spring 85 as obstructions are engaged by the cultivating tool causing the tool support member 15 to pivot on the connecting frame 12. The preload is adjusted by positioning the cotter key 87 through any one of the various apertures 86 in the end of the pressure rod to vary the compression of the spring in accord with varying soil conditions to be encountered by the cultivating tool. The simplified adjustment of depth for the cultivating tool is obtained by positioning the bifurcated coupling member 54 on the rib section 52 of the tool support and aligning the apertures 55 therein with pairs of apertures 53 in the rib section to provide a given angular relationship between the bifurcated member and the tool support member 15 with suitable bolt means such as is indicated at 100, positioned through these apertures to hold the bifurcated member on the rib section of the tool support member 15 in any desired angular relationship. As the angular relationship is varied, the position of the tool support member and hence the cultivating tool thereon will be varied relative to the connecting frame 12. This will vary the depth at which the cultivating tool will engage the earth to be cultivated.

The simplified adjustment is readily varied by removing the nut and bolt securing members 100 and repositioning the bifurcated member 54 with respect to the apertures 53 in the rib section. Thus, cultivating tools mounted on the tool support member 15 will be varied in depth from the connecting frame and may be pivoted relative to the connecting frame in the event that obstructions are engaged by the cultivating tool. The adjustment in depth of such shank assemblies is normally made upon initial usage of the agricultural apparatus when soil conditions are determined and operation of the cultivating tool and cultivating process is determined. Each individual shank assembly on an agricultural apparatus would be similarly adjusted to provide the same depth of cultivation for the type of soil encountered. Normally such conditions do not change in given geographical areas so that once a depth setting is obtained, it is not frequently changed unless it is desired to cultivate at a different depth. This simplified adjustment is readily accessible and easily made. In addition, the adjustment members are located and arranged on parts of the shank assembly so as to minimize the number of parts involved in the adjusting apparatus and to permit these parts to be constructed of a heavy rugged material or formed integral with the remaining parts of the structure for greater strength. Similarly, the spring loading of the tool support may be readily accomplished through the removal of the cotter key 87 and a compression spring 85 thereon. The improved shank assembly of the spring biased type provides a relatively simple arrangement of parts for mounting on the cultivating tool on an agricultural implement to eliminate complex adjusting apparatus. The simplified structure is low in cost such as to make it readily available for all equipments and purchases.

What is claimed is:

1. An adjustable shank assembly comprising, a tool support, a cultivating tool adapted to be mounted on a surface of the tool support, a connecting frame member, means included in part in said connecting frame member for attaching the shank assembly on a transverse support member of a cultivator, journal means included in part in one extremity of the connecting frame member and on one extremity of the tool support for pivotally mounting the tool support on the connecting frame member, a pressure rod, guide means pivotally mounted on the extremity of the connecting frame member remote from the journal means being fitted over and slidably mounting the pressure rod on the connecting frame member, clevis means connected to the pressure rod remote from the guide means, spring bias means including a compression spring encircling the pressure rod and bearing against the clevis means and the guide means to bias the tool support on the connecting frame member, a coupling means including a rib section on the tool support extending outwardly therefrom with a plurality of apertures therein and a bifurcated member pivotally connected at one extremity to the clevis means and fitting around the rib section at the other extremity wtih the bifurcated member having a plurality of apertures therein adapted to align with the apertures in the rib section to be secured thereon in varied angular positions relative thereto, and bolt means positioned through at least two of the plurality of apertures in the bifurcated member and rib section on the tool support to adjustably mount and position the tool support on the connecting frame member and adjustably position the cultivating tool relative to the connecting frame member.

2. The adjustable shank assembly of claim 1 in which the plurality of apertures in the rib section of the coupling means and the plurality of apertures in the bifurcated member are arranged to provide a plurality of pairs of apertures through which the bolt means are positioned to secure the bifurcated member on the rib section of the tool support in at least two points for a plurality of angular positions of adjustment of the tool support on the connecting frame member.

References Cited

UNITED STATES PATENTS

| | | | |
|---|---|---|---|
| 1,068,868 | 7/1913 | Dugger | 172—710 |
| 2,679,793 | 6/1954 | Rolf et al. | 172—462 X |
| 3,098,529 | 7/1963 | Wade et al. | 172—710 X |
| 3,258,076 | 6/1966 | Groenke | 172—710 |

ROBERT E. PULFREY, Primary Examiner

ALAN E. KOPECKI, Assistant Examiner

U.S. Cl. X.R.

172—739